United States Patent
Liu et al.

(10) Patent No.: US 11,194,908 B2
(45) Date of Patent: Dec. 7, 2021

(54) SYNTHESIZING SANITIZATION CODE FOR APPLICATIONS BASED UPON PROBABILISTIC PREDICTION MODEL

(71) Applicant: International Business Machines Corporation, Armonk, NY (US)

(72) Inventors: Peng Liu, Yorktown Heights, NY (US); Yunhui Zheng, Elmsford, NY (US); Marco Pistoia, Amawalk, NY (US); Omer Tripp, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 422 days.

(21) Appl. No.: 16/242,817

(22) Filed: Jan. 8, 2019

(65) Prior Publication Data
US 2020/0218805 A1 Jul. 9, 2020

(51) Int. Cl.
*H04L 29/06* (2006.01)
*G06F 21/56* (2013.01)
*G06N 7/00* (2006.01)

(52) U.S. Cl.
CPC .......... *G06F 21/56* (2013.01); *G06N 7/005* (2013.01); *G06F 2221/033* (2013.01)

(58) Field of Classification Search
CPC .......... G06F 21/56; G06F 21/60; G06F 21/64; G06F 21/563; G06F 21/565; G06F 21/566; G06F 21/568; G06F 2221/033; H04L 63/145; G06N 7/005
See application file for complete search history.

(56) References Cited

U.S. PATENT DOCUMENTS

| | | | | |
|---|---|---|---|---|
| 7,370,360 B2* | 5/2008 | Made | ............... | G06F 21/563 713/187 |
| 8,261,344 B2* | 9/2012 | Godwood | ............... | G06F 21/564 726/22 |
| 8,321,935 B1* | 11/2012 | Chen | ............... | G06F 21/56 726/22 |
| 8,370,942 B1* | 2/2013 | Peterson | ............... | G06F 21/577 726/24 |
| 8,949,992 B2* | 2/2015 | Amit | ............... | G06F 21/563 726/25 |

(Continued)

OTHER PUBLICATIONS

Russell Rebecca L. et al., Automated Vulnerability Detection in Source Code Using Deep Representation Learning, 2018.

(Continued)

*Primary Examiner* — Hosuk Song
(74) *Attorney, Agent, or Firm* — Garg Law Firm, PLLC; Rakesh Garg; Peter Edwards (57) ABSTRACT

Synthesizing sanitization code for applications based upon a probabilistic prediction model includes receiving a set of applications. The set of applications is partitioned into a first subset of applications and a second subset of applications. The first subset has one or more malicious payloads associated therewith, and the second subset has one or more non-malicious payloads associated therewith. A probabilistic prediction model is computed based upon the malicious payloads associated with the first subset of applications. One or more predicted malicious payloads are predicted from the probabilistic prediction model.

19 Claims, 7 Drawing Sheets

(56) References Cited

U.S. PATENT DOCUMENTS

| | | | | |
|---|---|---|---|---|
| 8,959,639 | B2* | 2/2015 | Shevchenko | G06F 21/56 |
| | | | | 726/24 |
| 9,754,112 | B1* | 9/2017 | Moritz | G06F 21/54 |
| 10,657,257 | B2* | 5/2020 | Copty | G06N 20/00 |
| 2013/0133075 | A1 | 5/2013 | Abadi et al. | |
| 2016/0359896 | A1 | 12/2016 | Hay et al. | |
| 2019/0190937 | A1* | 6/2019 | Stolfo | G06F 21/554 |

OTHER PUBLICATIONS

Balzarotti Davide et al., Composing Static and Dynamic Analysis to Validate Sanitization in Web Applications, IEEE Symposium on Security and Privacy 2008.

Roee Hay et al., Dynamic Detection of Inter-applicattion Communication Vulnerabilities in Android, Jul. 2015.

Octavian Ganea, Learnin in pair-wise CRFs—a turtorial. Application in entity linking, Dec. 1, 2014.

Omer Tripp et al., TAJ: Effective Taint Analysis of Web Applications, Jun. 15, 2009.

Takaaki Tateishi et al., Path- and Index-sensitive String Analysis Based on Monadic Second-order Logic, Jul. 17, 2011.

* cited by examiner

SYNTHESIZING SANITIZATION CODE FOR APPLICATIONS BASED UPON PROBABILISTIC PREDICTION MODEL

TECHNICAL FIELD

The present invention relates generally to a method, system, and computer program product for synthesizing sanitization code for applications. More particularly, the present invention relates to a method, system, and computer program product for synthesizing sanitization code for applications based upon a probabilistic prediction model.

BACKGROUND

Sanitization is a process of preventing malicious data from being input to a software application by an attacker to avoid undesirable behavior that may be caused by processing of the malicious data by the application. An example of such undesirable behavior that may be caused by a malicious data attack includes compromising the security of the application or a computer associated with the application. During an attack, an attacker configures the malicious data to cause the undesirable behavior by application. A example of a common malicious attack is attacking a website by structured Query Language (SQL) injection. SQL is a common command-and-control language for relational databases that are often used in the back end of web applications. During an SQL injection attack, an attacker submits data to a website hat has been deliberately formatted in such a way that results in the website interpreting the data as a database command which then executes. If the command causes modification of entries in a database, or even deletion of the entire database, important or confidential data may be deleted, lost or stolen. Further, the SQL injection attacked may cause the security of individual machines or entire networks to be compromised leading to unauthorized access by an attacker. A common method of sanitizing input data to prevent malicious data from being executed is to validate the input data using a blacklist.

SUMMARY

The illustrative embodiments provide a method, system, and computer program product. An embodiment of a computer-implemented method includes receiving a set of applications. The embodiment further includes partitioning the set of applications into a first subset of applications and a second subset of applications. In the embodiment, the first subset has one or more malicious payloads associated therewith, and the second subset has one or more non-malicious payloads associated therewith. The embodiment further includes computing a probabilistic prediction model based upon the malicious payloads associated with the first subset of applications, and predicting one or more predicted malicious payloads from the probabilistic prediction model.

Another embodiment further includes determining a set of code sanitizers based upon the one or more predicted malicious payloads. In another embodiment, the set of code sanitizers are configured to prevent execution of at least one of the one or more predicted malicious payloads. Another embodiment further includes determining a subset of the set of code sanitizers. In another embodiment, determining the subset of the set of code sanitizers includes determining a minimal subset of the set of code sanitizers required to prevent execution of the one or more predicted malicious payloads.

Another embodiment further includes implementing the subset of the code sanitizers in a target application. Another embodiment further includes receiving a target payload by the target application, and determining that the target payload is a malicious payload using the subset of the code sanitizers. Another embodiment further include preventing execution of the target payload.

Another embodiment further includes scanning the set of applications using one or more automated security scanning tools, and determining the first subset of applications and the second subset of application based upon the scanning.

Another embodiment further includes determining at least one of the one or more malicious payloads or the one or more non-malicious payloads based upon the scanning. Another embodiment further includes refining the probabilistic predictive model based upon one or more of the predicted malicious code or the non-malicious code.

In another embodiment, the probabilistic prediction model includes a recurrent neural network (RNN).

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to synthesizing sanitization code for applications based upon a probabilistic prediction model. Embodiments recognize that software applications and systems, such as web applications and mobile applications, often suffer subtle vulnerabilities and face external attack by malicious input payloads that are configured to exploit the vulnerability and cause the software application to exhibit undesirable behavior such as comprising of application and/or system security. For example, web applications often mishandle incoming Hypertext Transfer Protocol (HTTP) requests, and mobile applications often neglect to sanitize/validate incoming inter-application communication (IAC) messages. In an IAC attack, another application sends a message to a targeted application crafted by a malicious attacker to cause the targeted application to perform an undesirable action such as crashing or exposing a security vulnerability.

Embodiments further recognize that a typical manner of preventing a malicious payload from executing in an application is by blacklist pattern matching. Typically a developer prepares a blacklist of statements that are not allowed in the input to an application, and the system compares statements within a payload to the statements in the blacklist. If statements in the payload match a pattern of statements in the blacklist, the system determines that the payload is malicious and prevents execution of the statements in the payload.

In an example of a malicious SQL injection attack, an payload directed at a targeted application expects a statement of the form s= s="SELECT*FROM userinfo WHERE id="+a_variable+";" in which "a_variable+" represents a database command. In the example, the targeted application receives a payload including the statement SELECT*FROM userinfo WHERE id=1; DROP TABLE users; which includes a "DROP TABLE" command intended for the target application to drop all tables in the database when executed. In the example, the targeted application includes a blacklist having entries of Blacklist={'drop', 'delete' . . . }. By pattern matching the "DROP" command in the payload to the "drop" command in the playlist, the application prevents execution of the command.

Embodiments recognize that the conventional methods of using blacklists for sanitizing malicious code suffer from a number of disadvantages. For example, when a developer prepares a blacklist, the blacklist may not be sufficient due to a limited amount of entries in the blacklist to adequately cover various attack scenarios. Further, a blacklist that includes too many entries or the use of too many sanitizers may result in a slowdown of performance of the application or system.

Various embodiments described herein provide for a synthesizing sanitation code using a "Big Code" approach in which "Big Code" refers to automatic learning of sanitizers for preventing the execution of malicious payloads based upon predicting malicious payloads using a probabilistic predictive model trained from known malicious code associated known non-secure applications. In one or more embodiments, the probabilistic predictive model is constructed using a recurrent neural network (RNN). Recurrent neural networks (RNN) are networks with recurrent connections (going in the opposite direction that the "normal" signal flow) which form cycles in the network's topology. In RNNs, a neuron feeds back information to itself in addition to passing it to the next neuron in the RNN. Computations derived from earlier input are fed back into the network, which gives an RNN something similar to a short-term memory. Feedback networks, such as RNNs, are dynamic; their 'state' is changing continuously until they reach an equilibrium point.

In one or more embodiments, a system implements a simulated attacker to generate predicted malicious payloads from known applications and a defender to compute sanitizers for preventing execution of malicious payloads based upon the predicted malicious payloads. In an embodiment, the system receives a large set S of applications. In a particular embodiment, the system obtains the set S of applications through an application store. In the embodiment, the system applies one or more existing automated security scanning tools to partition the set S into subsets $S_G$ and $S_B$, where $S_G$ contains applications that are deemed sufficiently secure by the tools and SB contains the remaining applications (e.g., applications that are deemed to be non-secure by the tools). In the embodiment, the automated security scanning tools further determine malicious payloads associated with the subset of non-secure applications ($S_B$) and non-malicious payloads associated with the subset of secure applications ($S_G$).

In the embodiment, the system computes a probabilistic prediction model based upon the malicious payloads associated with the non-secure applications subset ($S_B$). In a particular embodiment, the probabilistic predictive model is a RNN based model. In the embodiment, the system generates predicted malicious payloads from the probabilistic prediction model. In particular embodiments, one or more of the predicted malicious payloads or the non-malicious payloads are used to iteratively refine the probabilistic prediction model using a classic machine learning training/test workflow.

In the embodiment, the system further provides the predicted malicious payloads to the defender and the defender determines a set of code sanitizers to prevent malicious attacks based upon the predicted malicious payloads. In one or more embodiments, the defender optimizes the set of code sanitizers to determine a subset of code sanitizers. In a particular embodiment, the defender computes a minimal set of code sanitizers to adequately cover likely attack scenarios based upon the predicted malicious payloads. For example, a particular sanitizer may cover a subset of malicious payloads while other sanitizers may cover the same subset of malicious payloads. In such a situation, the system may include only one of the sanitizers in the subset of sanitizers. Accordingly, the system may include the minimal number of sanitizers to cover all or a portion of the predicted malicious payloads. In particular embodiments, a sanitizer is computed by determining a blacklist including portions of the predicted malicious payloads.

In one or more embodiments, the subset of code sanitizers is implemented in a target application and used by the target application to inspect payloads received by the application, and prevent execution of payloads determined to be malicious by one or more of the subset of code sanitizers. In particular embodiments, one or more of the sanitizers of the subset of sanitizers uses pattern matching to identify whether a received target payload matches a portion of a predicted malicious payload within a blacklist of a sanitizer.

An embodiment can be implemented as a software application. The application implementing an embodiment can be configured as a modification of an existing application or platform, as a separate application that operates in conjunction with an existing application or platform, a standalone application, or some combination thereof.

The illustrative embodiments are described with respect to certain types of tools and platforms, procedures and algorithms, services, devices, data processing systems, environments, components, probabilistic models, sanitizers, malicious payloads, non-malicious payloads, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
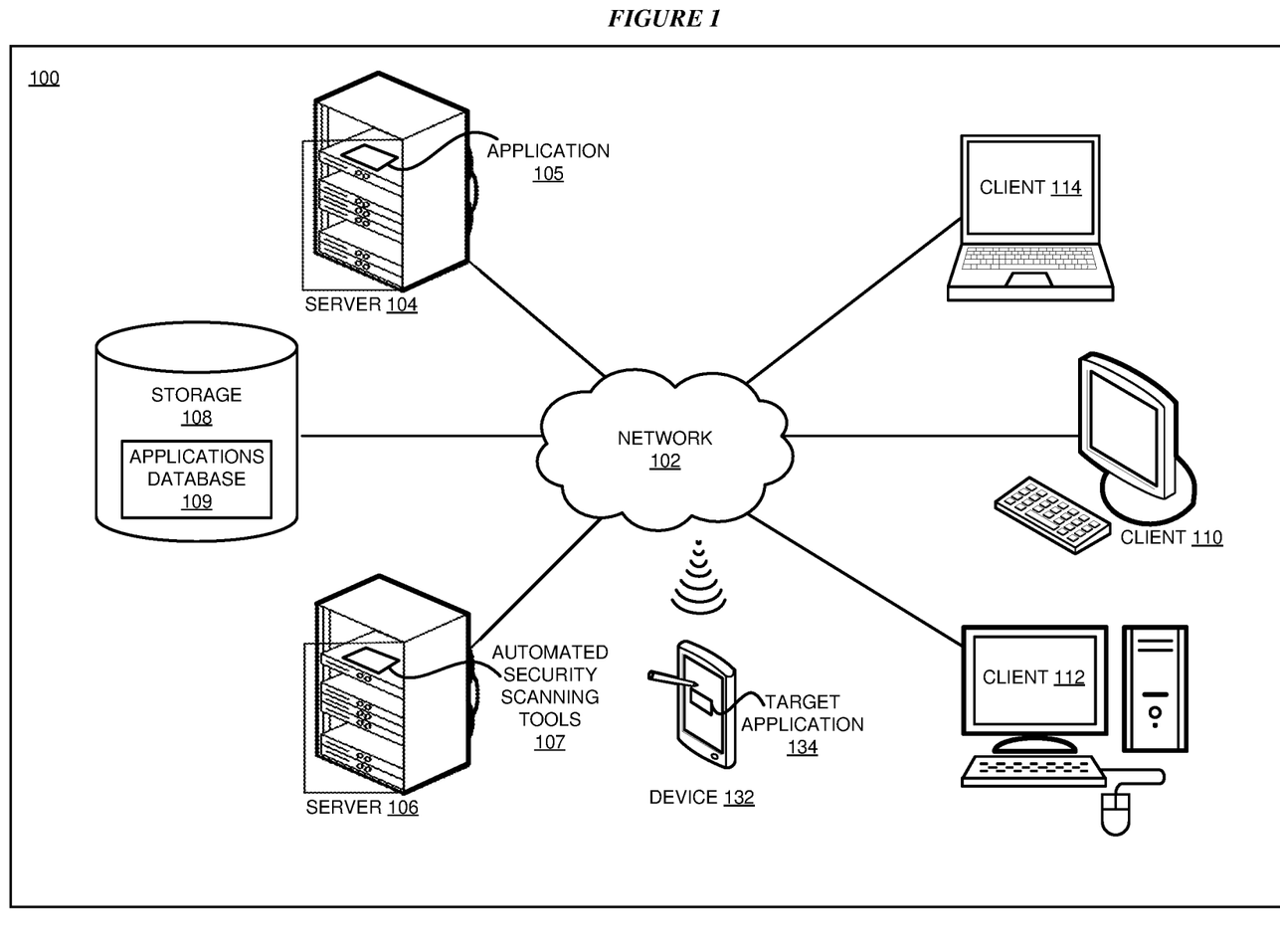
FIG. 1 depicts a block diagram of a network of data processing systems in which illustrative embodiments may be implemented.
Figure 2:
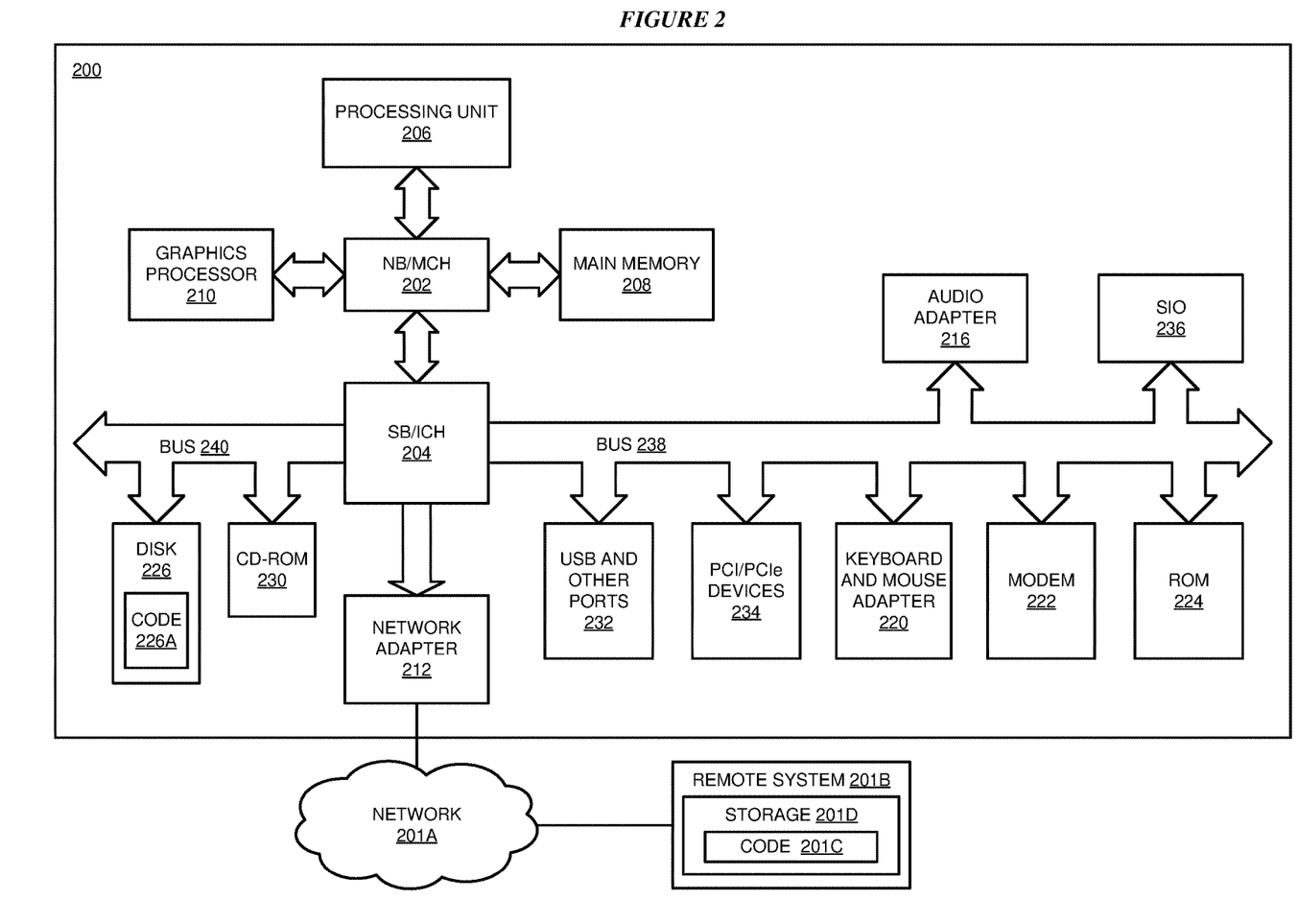
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes target application 134 within executing within device 132 in which target application 134 implements one or more code sanitizers for preventing execution of malicious payloads as described herein with respect to one or more embodiments. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for synthesizing sanitization code for applications based upon a probabilistic prediction model in accordance with one or more embodiments.

Server 106 includes one or more automated security scanning tools 107 configured to scan one or more applications, identify the applications as either secure or non-secure, determine non-malicious payloads associated with the non-malicious applications, and determine malicious payload associated with the non-secure applications as described herein with respect to various embodiments. Storage device 108 includes an applications database 109 configured to store one or more applications for scanning by automated security scanning tools 107 as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
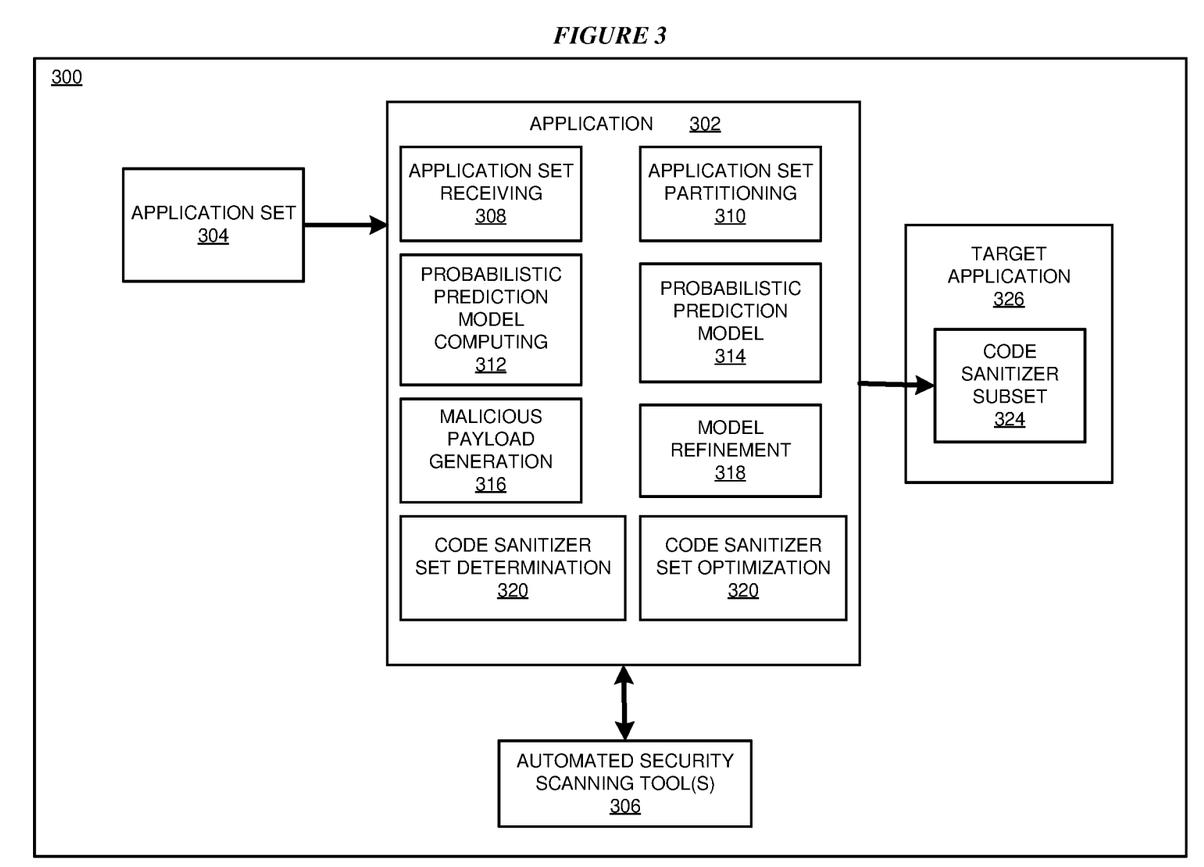
FIG. 3 depicts a block diagram of an example configuration for synthesizing sanitization code for applications based upon a probabilistic prediction model in accordance with an illustrative embodiment.

With reference to FIG. 3, this figure depicts a block diagram of an example configuration 300 for synthesizing sanitization code for applications based upon a probabilistic prediction model in accordance with an illustrative embodiment. The example embodiment includes an application 302. In a particular embodiment, application 302 is an example of application 105 of FIG. 1.

Application 302 receives an application set 304 including one or more applications. In a particular embodiment, application 302 receives application set 304 from an applications database or applications store.

Application 302 is in communication with one or more automated security scanning tools 306 configured to scan an application, determine whether the application is secure or non-secure, determine non-malicious payloads associated with secure applications, and malicious payloads associated with non-secure applications. In a particular embodiment, automated security scanning tools 306 are an example of automated security scanning tools 107 of FIG. 1.

Application 302 includes an application set receiving component 308, an application set partitioning component 310, a probabilistic prediction model computing component 312, a probabilistic prediction model 314, a malicious payload generation component 316, a model refinement component 318, a code sanitizer set determination component 320, and a code sanitizer set optimization component 322.

In the embodiment, application set receiving component 308 is configured to receive application set 304 and initiate scanning of application set 304 by automated security scanning tools 306. Application set partitioning component 310 is configured to partition the applications of application set 304 into a subset of secure applications and a subset of nonsecure applications based upon the results of the scanning of application set 304 by automated security scanning tools 306. In the embodiment, application set partitioning component 310 further receives malicious payloads associated with the subset of non-secure applications and non-malicious payloads associated with the subset of secure applications from the automated security scanning tool 306.

In the embodiment, probabilistic prediction model computing component 312 computes probabilistic prediction model 314 based upon the malicious payloads associated with the non-secure applications subset. In a particular embodiment, probabilistic predictive model 314 is a RNN based model. In the embodiment, malicious payload generation component 316 generates predicted malicious payloads as outputs of probabilistic prediction model 314. In the embodiment, model refinement component 318 is configured to iteratively refine probabilistic prediction model 314 based upon one or more of the predicted malicious payloads or the non-malicious payloads.

In the embodiment, code sanitizer set determination component 320 is configured to determine a set of code sanitizers to prevent malicious attacks based upon the predicted malicious payloads. In the embodiment, code sanitizer set optimization component 322 is configured to optimize the code sanitizers set to determine a code sanitizers subset 324 that includes a portion of the set of code sanitizers. In a particular embodiment, code sanitizer set optimization component 322 computes a minimal set of code sanitizers to cover all or a portion of the predicted malicious payloads.

In the embodiment, code sanitizer subset 324 is implemented in a target application 326 and used by the target application 326 to inspect payloads received by the application, and prevent execution of payloads determined to be malicious by one or more of the subset of code sanitizers. In particular embodiments, one or more of the sanitizers of the subset of sanitizers uses pattern matching to identify whether a received target payload matches a portion of a predicted malicious payload within a blacklist of a sanitizer.

Figure 4:
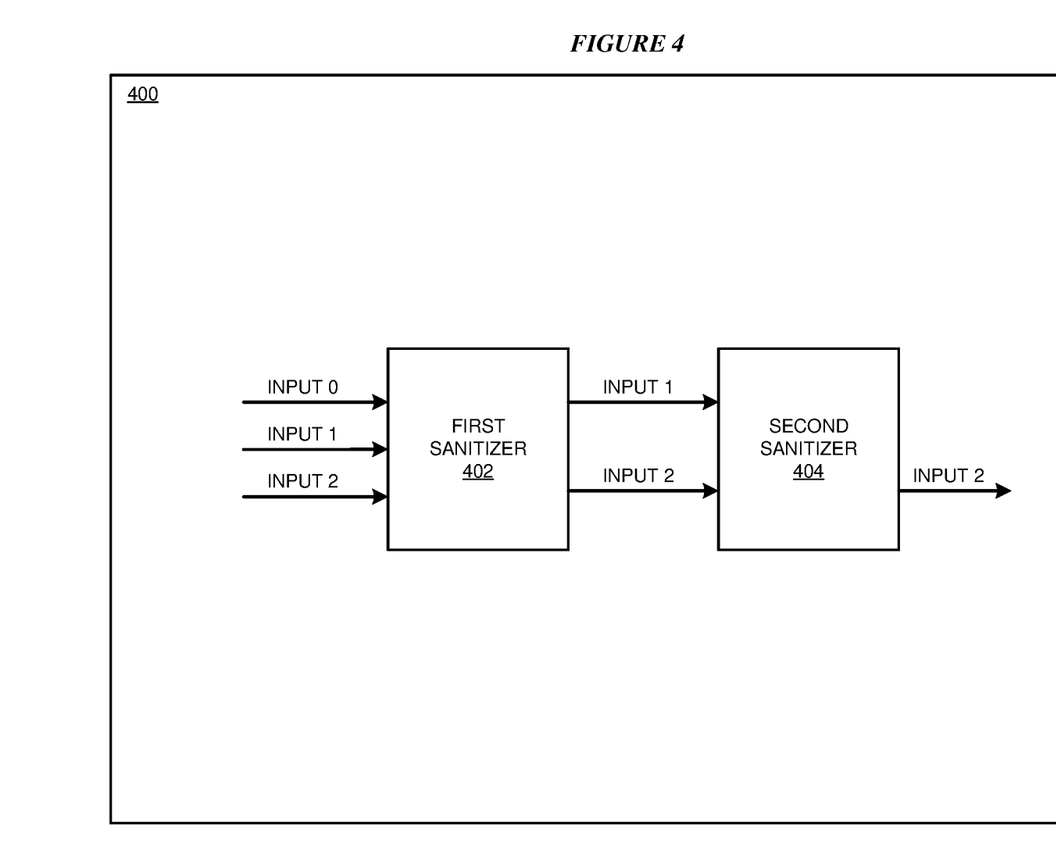
FIG. 4 depicts a block diagram of an example configuration for code sanitizer chaining to prevent execution of malicious payloads in accordance with an illustrative embodiment.

With reference to FIG. 4, this figure depicts a block diagram of an example configuration 400 for code sanitizer chaining to prevent execution of malicious payloads in accordance with an illustrative embodiment. FIG. 4 illustrates a first sanitizer 402 connected to a second sanitizer 404 within a target application. In the illustrated embodiment, each of first sanitizer 402 and second sanitizer 404 includes a different associated blacklist. In one or more embodiments, first sanitizer 402 and second sanitizer 404 are determined from predicted malicious payloads as described herein with respect to various embodiments. In the example of FIG. 4, first sanitizer 402 receives a first target payload (Input 0), a second target payload (Input 1) and a third target payload (Input 3). First sanitizer 402 determines that a pattern of the first target payload (Input 0) matches an entry in the blacklist associated with first sanitizer 402, and first sanitizer 402 stops propagation of the first target payload (Input 0).

For the second target payload (Input 1) and the third target payload (Input 2), first sanitizer 402 does not find a pattern match within the blacklist associated with first sanitizer 402 and allows the second target payload (Input 1) and the third target payload (Input 2) to pass to second sanitizer 404. In the example, second sanitizer 404 finds a pattern match for the second target payload (Input 1) within the blacklist associated with second sanitizer 404, and second sanitizer 404 stops propagation of the second target payload (Input 1). In the example, second sanitizer 404 does not find a pattern match for the third target payload (Input 2) within the blacklist associated with second sanitizer 404 and allows the target application to execute the third target payload. Accordingly, the example configuration 400 determines that the first target payload (Input 0) and the second target payload (Input 1) are malicious, while third target payload (Input 2) is determined to be non-malicious. Although the example configuration of FIG. 4 is shown as having two sanitizers arranged in series, in other embodiments any number of sanitizers may be arranged in series, in parallel, or in a combination of series and parallel.

Figure 5:
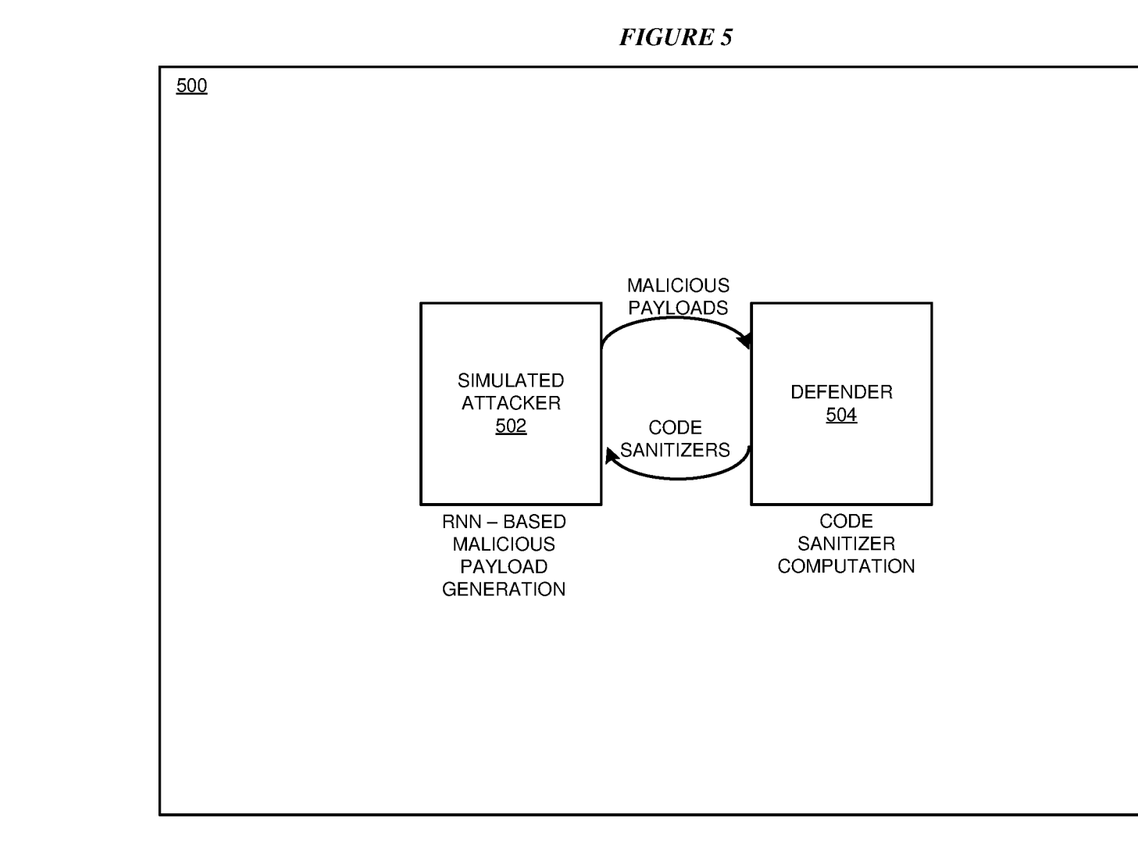
FIG. 5 depicts a block diagram of an example simulated attacker and defender process flow for synthesizing sanitization code in accordance with an illustrative embodiment.

With reference to FIG. 5, this figure depicts a block diagram of an example simulated attacker and defender process flow for synthesizing sanitization code in accordance with an illustrative embodiment. In the embodiment, a simulated attacker 502 is configured to generate one or more malicious payloads using a RNN-based malicious payload generation process including a RNN model as described with respect to one or more embodiments.

In the embodiment, simulated attacker 502 sends the one or more malicious payloads to a defender 504. In the embodiment, defender 504 is configured to compute one or more code sanitizers based upon the malicious payloads to prevent execution of the target payloads received by an application matching a pattern of the malicious payloads as described with respect to one or more embodiments. In the example, defender 504 may provide the one or more code sanitizers to simulated attacker 502 to further refine the RNN model.

Figure 6:
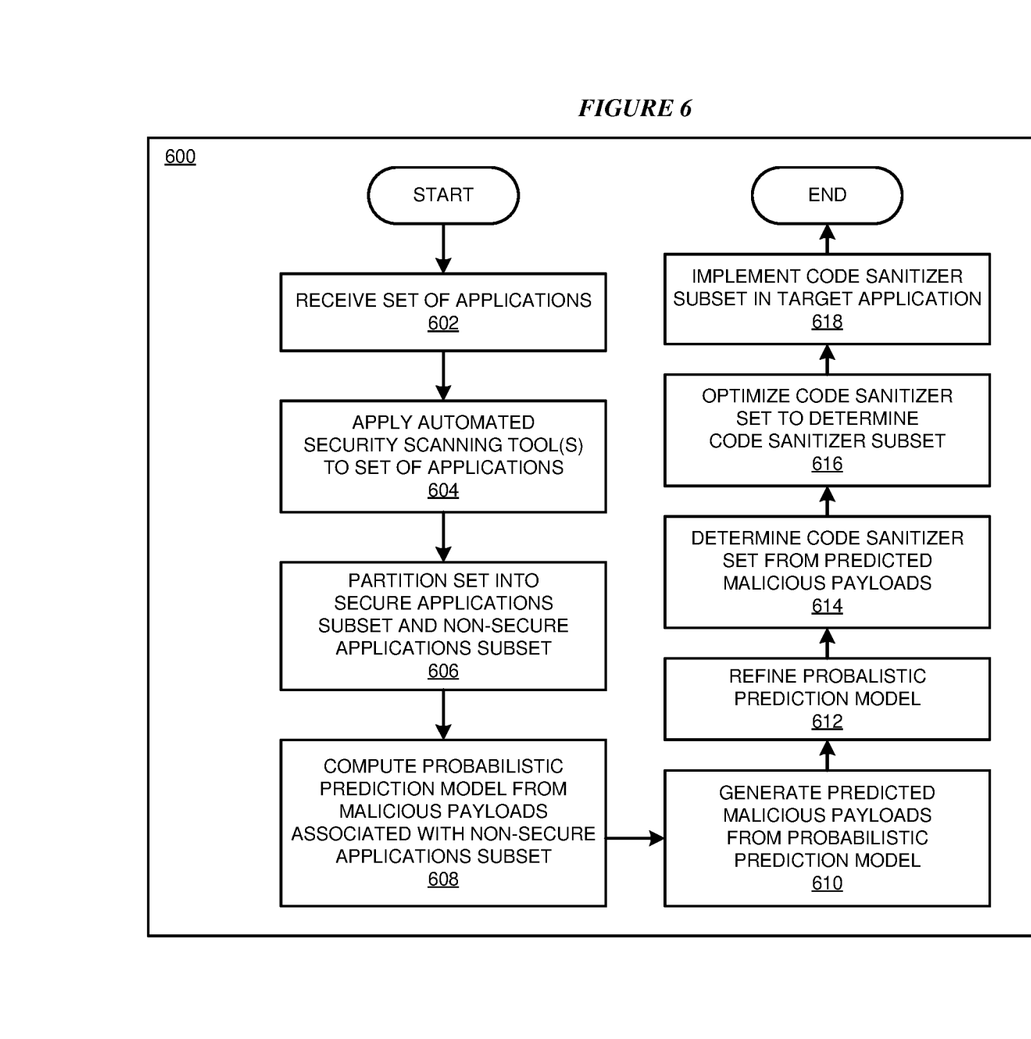
FIG. 6 depicts a flowchart of an example training process for synthesizing sanitization code for applications based upon a probabilistic prediction model in accordance with an illustrative embodiment.

With reference to FIG. 6, this figure depicts a flowchart of an example training process 600 for synthesizing sanitization code for applications based upon a probabilistic prediction model in accordance with an illustrative embodiment. In block 602, application 105 receives a set of application including one or more applications. In a particular embodiment, application 105 receives the set of applications from an applications database or applications store. In block 604, application 105 scans the set of applications using one or more automated security scanning tools to determine whether each application is secure or non-secure, determine non-malicious payloads associated with secure applications, and determine malicious payloads associated with non-secure applications.

In block 606, application 105 partitions the set of applications into a first subset of secure applications and a second subset of nonsecure applications based upon the scanning of the set of applications. In block 608, application 105 computes a probabilistic prediction model based upon the malicious payloads associated with the non-secure applications subset. In a particular embodiment, the probabilistic predictive model is a RNN based model. In block 610, application 105 generates one or more predicted malicious payloads from the probabilistic prediction model. In block 612, application 105 refines the probabilistic prediction model based upon one or more of the predicted malicious payloads or the non-malicious payloads.

In block 614, application 105 determines a set of code sanitizers based upon the predicted malicious payloads in which the set of code sanitizers are configured to prevent execution of the one or more predicted malicious payloads. In a particular embodiment, application 105 performs a trial-and-error procedure to find one or more code sanitizers from the set of code sanitizers that prevent a malicious payload while ensuring that a non-malicious payload is not prevented. In block 616, application 105 optimizes the set of code sanitizers to determine a subset of the code sanitizers. In a particular embodiment, application 105 determines a minimal subset of the code sanitizers required to prevent execution of the predicted malicious payloads.

In block 618, application 105 implements the subset of code sanitizers in a target application for utilization by the target application to prevent execution of malicious payloads. In particular embodiments, one or more of the code sanitizers of the subset of code sanitizers uses pattern matching to identify whether a received target payload matches a portion of a predicted malicious payload within a blacklist of the sanitizer. Process 600 then ends.

Figure 7:
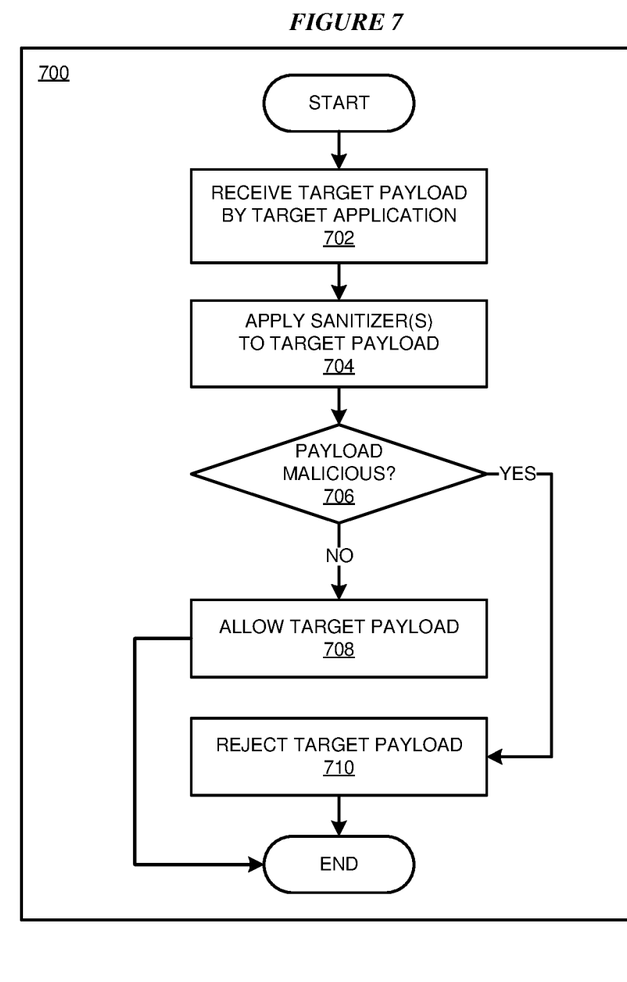
FIG. 7 depicts a flowchart of an example process for sanitizing input payloads based upon predicted malicious payloads in accordance with an illustrative embodiment.

FIG. 7 depicts a flowchart of an example process 700 for sanitizing input payloads based upon predicted malicious payloads in accordance with an illustrative embodiment. In block 702, target application 134 receives a target payload from an entity. In block 704, target application 134 applies one or more code sanitizers to the target payload to determine whether the target payload is malicious. In one or more embodiments, each of the code sanitizers are generated using the process 600 described with respect to FIG. 6. In particular embodiments, the code sanitizers use pattern matching to match portions of the target payload to entries in one or more blacklists associated with the code sanitizers.

In block 706, application 134 determines whether the target payload is malicious based upon the analysis of the one or more code sanitizers. If application 134 determines that the target payload is not malicious, process 700 continues to block 708. In block 708, target application 134 allows the target payload to execute and process 700 ends. If application 134 determines that the target payload is malicious, process 700 continues to block 710. In block 710, application 134 rejects the target payload and prevents execution of the target payload and process 700 ends.

Thus, a computer implemented method, system or apparatus, and computer program product are provided in the illustrative embodiments for synthesizing sanitization code for applications based upon a probabilistic prediction model and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a set of applications;
   partitioning the set of applications into a first subset of applications and a second subset of applications, the first subset having one or more malicious payloads associated therewith and the second subset having one or more non-malicious payloads associated therewith;
   computing a probabilistic prediction model based upon the malicious payloads associated with the first subset of applications, wherein the probabilistic prediction model is constructed using a recurrent neural network; and
   predicting one or more predicted malicious payloads from the probabilistic prediction model.

2. The computer-implemented method of claim 1, further comprising:

determining a set of code sanitizers based upon the one or more predicted malicious payloads.

3. The computer-implemented method of claim 2, wherein the set of code sanitizers are configured to prevent execution of at least one of the one or more predicted malicious payloads.

4. The computer-implemented method of claim 2, further comprising:
determining a subset of the set of code sanitizers.

5. The computer-implemented method of claim 4, wherein determining the subset of the set of code sanitizers includes determining a minimal subset of the set of code sanitizers required to prevent execution of the one or more predicted malicious payloads.

6. The computer-implemented method of claim 4, further comprising:
implementing the subset of the set of code sanitizers in a target application.

7. The computer-implemented method of claim 6, further comprising:
receiving a target payload by the target application; and
determining that the target payload is a malicious payload using the subset of the set of code sanitizers.

8. The computer-implemented method of claim 7, further comprising:
preventing execution of the target payload.

9. The computer-implemented method of claim 1, further comprising:
scanning the set of applications using one or more automated security scanning tools; and
determining the first subset of applications and the second subset of application based upon the scanning.

10. The computer-implemented method of claim 9, further comprising:
determining at least one of the one or more malicious payloads or the one or more non-malicious payloads based upon the scanning.

11. The computer-implemented method of claim 1, further comprising:
refining the probabilistic predictive model based upon one or more of the one or more predicted malicious payloads or the one or more non-malicious payloads.

12. A computer usable program product comprising one or more computer-readable storage devices, and program instructions stored on at least one of the one or more storage devices, the stored program instructions comprising:
program instructions to receive a set of applications;
program instructions to partition the set of applications into a first subset of applications and a second subset of applications, the first subset having one or more malicious payloads associated therewith and the second subset having one or more non-malicious payloads associated therewith;
program instructions to compute a probabilistic prediction model based upon the malicious payloads associated with the first subset of applications, wherein the probabilistic prediction model is constructed using a recurrent neural network; and
computer instructions to predict one or more predicted malicious payloads from the probabilistic prediction model.

13. The computer usable program product of claim 12, further comprising:
program instructions to determine a set of code sanitizers based upon the one or more predicted malicious payloads.

14. The computer usable program product of claim 13, wherein the set of code sanitizers are configured to prevent execution of at least one of the one or more predicted malicious payloads.

15. The computer usable program product of claim 13, further comprising:
program instructions to determine a subset of the set of code sanitizers.

16. The computer usable program product of claim 15, wherein determining the subset of the set of code sanitizers includes determining a minimal subset of the set of code sanitizers required to prevent execution of the one or more predicted malicious payloads.

17. The computer usable program product of claim 12, wherein the computer usable code is stored in a computer readable storage device in a data processing system, and wherein the computer usable code is transferred over a network from a remote data processing system.

18. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive a set of applications;
program instructions to partition the set of applications into a first subset of applications and a second subset of applications, the first subset having one or more malicious payloads associated therewith and the second subset having one or more non-malicious payloads associated therewith;
program instructions to compute a probabilistic prediction model based upon the malicious payloads associated with the first subset of applications, wherein the probabilistic prediction model is constructed using a recurrent neural network; and
computer instructions to predict one or more predicted malicious payloads from the probabilistic prediction model.

\* \* \* \* \*